(12) United States Patent
Meisier

(10) Patent No.: US 12,122,326 B2
(45) Date of Patent: **\*Oct. 22, 2024**

(54) AUTOMOBILE HEADREST SAFE

(71) Applicant: Irving Meisier, Birmingham, AL (US)

(72) Inventor: Irving Meisier, Birmingham, AL (US)

(73) Assignee: The Headrest Safe IP Company, LLC, Birmingham, AL (US)

( \* ) Notice: Subject to any disclaimer, the term of this patent is extended or adjusted under 35 U.S.C. 154(b) by 286 days.

This patent is subject to a terminal disclaimer.

(21) Appl. No.: 17/224,570

(22) Filed: Apr. 7, 2021

(65) Prior Publication Data
US 2022/0281387 A1  Sep. 8, 2022

Related U.S. Application Data

(60) Provisional application No. 63/157,173, filed on Mar. 5, 2021.

(51) Int. Cl.
*B60R 7/04* (2006.01)
*B60N 2/879* (2018.01)
*B60R 7/14* (2006.01)

(52) U.S. Cl.
CPC .............. *B60R 7/043* (2013.01); *B60N 2/879* (2018.02); *B60R 7/14* (2013.01)

(58) Field of Classification Search
CPC .................................. B60R 7/043; B60R 7/14
See application file for complete search history.

(56) References Cited

U.S. PATENT DOCUMENTS

| 2,132,323 | A | * | 10/1938 | Sander | .............. B60R 7/14 224/281 |
|---|---|---|---|---|---|
| 3,437,374 | A | | 4/1969 | Bennett | |
| 3,449,011 | A | * | 6/1969 | Edwards | .................. B60N 3/08 297/188.21 |
| 3,464,606 | A | * | 9/1969 | Nordeen | .............. A47B 81/005 224/281 |
| 3,568,890 | A | | 3/1971 | Leachman | |
| 4,524,904 | A | | 6/1985 | Masse et al. | |
| 5,511,711 | A | * | 4/1996 | Kunz | ........................ B60R 7/14 224/539 |
| 5,996,865 | A | | 12/1999 | Bissey | |
| 6,215,518 | B1 | | 4/2001 | Watkins | |
| 6,445,408 | B1 | | 9/2002 | Watkins | |
| 7,188,896 | B2 | | 3/2007 | Embach | |
| 7,305,858 | B1 | | 12/2007 | Wu | |

(Continued)

FOREIGN PATENT DOCUMENTS

KR 19980001253 3/1998
WO WO2013043138 3/2013

*Primary Examiner* — Derek J Battisti
(74) *Attorney, Agent, or Firm* — Baker Donelson Bearman Caldwell & Berkowitz, PC

(57) ABSTRACT

An automobile headrest safe is disclosed which is used in conjunction with the seat of the automobile. The headrest safe includes an exterior housing with a front surface, a rear surface, a left side surface, a right side surface, a top surface, and a bottom surface. The exterior housing includes a pivoting door. The headrest safe also includes a hollow metal container positioned within the interior of the exterior housing. The container has a main portion and a spring biased exterior housing door. The container also has a reciprocating gun tray. The exterior housing door has a biometric lock.

19 Claims, 4 Drawing Sheets

(56) References Cited

U.S. PATENT DOCUMENTS

| | | | |
|---|---|---|---|
| 7,434,427 B1 * | 10/2008 | Miresmaili | F41C 33/06 |
| | | | 42/70.11 |
| 7,980,630 B2 | 7/2011 | Pos | |
| 8,967,538 B2 | 3/2015 | Guering | |
| 9,283,876 B2 | 3/2016 | Dinger et al. | |
| 10,232,790 B1 | 3/2019 | Adrain | |
| 10,406,957 B2 * | 9/2019 | Faruque | B60N 2/90 |
| 10,850,672 B1 * | 12/2020 | Meisler | B60R 7/14 |
| 2008/0196637 A1 | 8/2008 | Howell et al. | |
| 2010/0043682 A1 | 2/2010 | Talmage et al. | |
| 2014/0231480 A1 * | 8/2014 | Baker | B60R 7/14 |
| | | | 224/567 |
| 2015/0343958 A1 * | 12/2015 | McGoldrick | E05G 1/04 |
| | | | 29/428 |
| 2017/0050545 A1 | 2/2017 | Aguilar Ruelas | |
| 2017/0138112 A1 | 5/2017 | Makke et al. | |
| 2018/0073836 A1 | 3/2018 | Romeo et al. | |
| 2019/0102963 A1 | 4/2019 | Owens et al. | |

\* cited by examiner

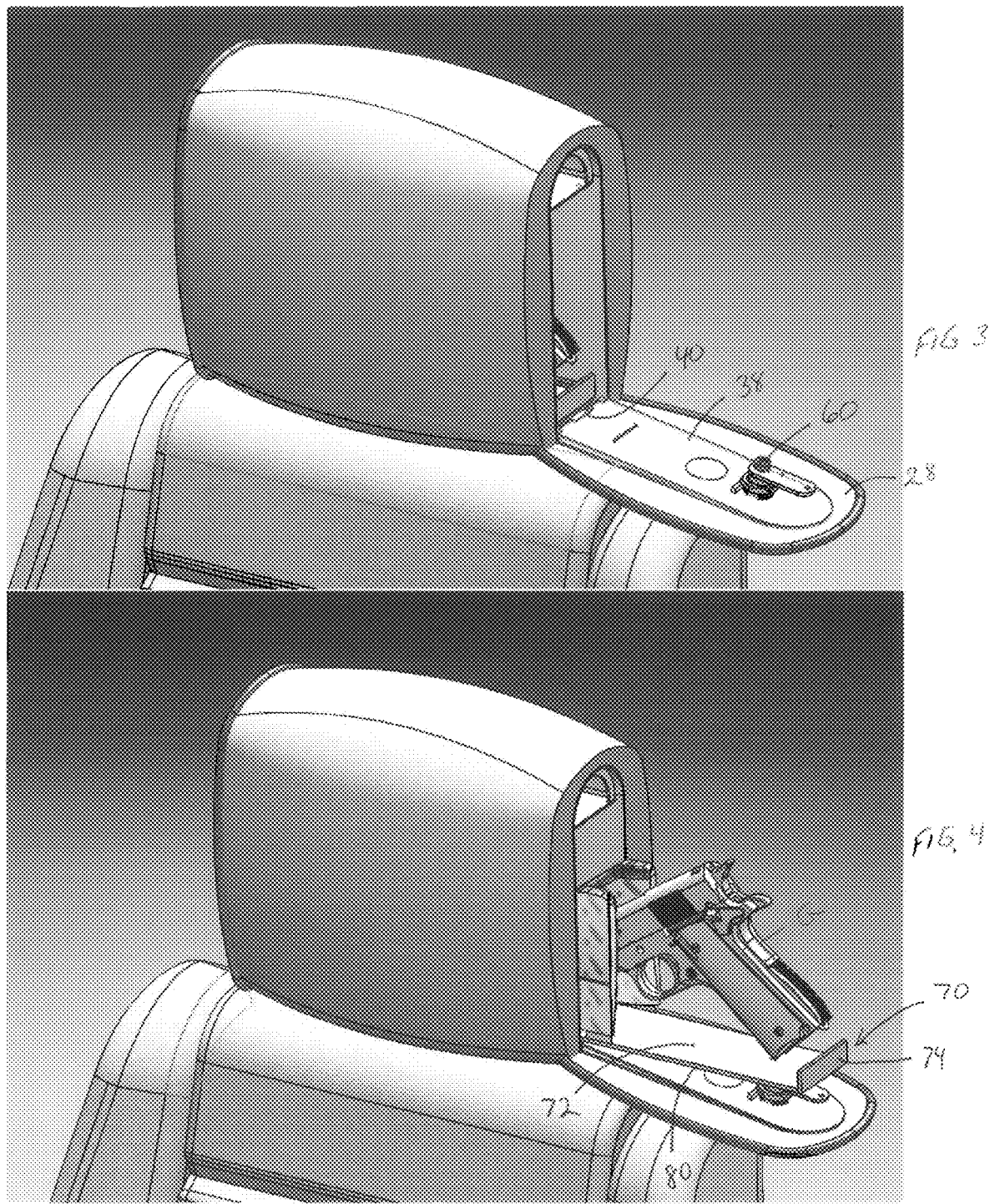

AUTOMOBILE HEADREST SAFE

CROSS REFERENCE TO RELATED APPLICATIONS

Applicant claims the benefit of U.S. Provisional Patent Application Ser. No. 63/157,173 filed Mar. 5, 2021 and entitled "Automobile Headrest Safe".

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD

The present disclosure relates to safes, and more particularly, the disclosure relates to a gun safe which is found in an automobile.

BACKGROUND OF THE INVENTION

Safes have been used for decades to allow for the storage of items, such as guns while preventing the unauthorized access to the guns therein. Many safes use a metal enclosure having a lock. The lock may be in the form of a combination lock, key lock, or a more modern biometric lock which is access through a person's fingerprint or the like.

Guns are oftentimes transported or stowed inside cars for the protection of the occupant. While guns may be stowed within a console or glove box of a car, these are not considered to be a gun safe as they do not have the necessary lock and tamper resistance capabilities. A car storage compartment has also been designed to be included into the headrest of a seat, as shown in Korean Patent Application KR19980001253. However, here again, the headrest storage compartment does not include a lock or the tamper resistant capabilities to prevent access to a gun therein. Furthermore, the access to the interior area of the storage compartment is difficult for a driver.

Some gun safes have been adapted to be used within automobiles or cars. These gun safes may be in the form of a metal box which is simply secured to the car, such as that shown in U.S. Pat. No. 5,996,865. Gun safes have also been designed to be incorporated into the glove box or console of a car, as shown in U.S. Patent Application No. 20190102963. A gun safe has also been designed to be incorporated into the structure of a car's sun visor, as shown in U.S. Pat. No. 10,232,790. While these gun safes provide a secure structure for the safe storage of a gun, they require the use of multiple hands to operate and do not provide the most direct access to the gun within the safe. Also, as they are stored in a stationary position, the person must reach into the gun safe in order to extract the gun therein.

Accordingly, it is seen that a need remains for a gun safe which is incorporated into an automobile for the safe storage yet easy access to a gun therein. It is to the provision of such therefore that the present invention is primarily directed.

BRIEF SUMMARY OF THE INVENTION

A safe adapted to be mounted to an automobile seat comprises an exterior housing contoured to resemble a car headrest. The exterior housing has a front surface oriented relative to the front surface of the automobile seat, a rear surface oppositely disposed from the front surface, two oppositely disposed side surfaces extending between the front surface and the rear surface, a top surface extending between the front surface and the rear surface, and a bottom surface extending between the front surface and the rear surface. One the side surfaces has a pivotal door portion for reciprocal movement between a closed position and an open position. The safe also includes a container mounted within the exterior housing. The container has a main portion and a container door pivotally mounted to the main portion for reciprocal movement between a locked position and an unlocked position. A lock is coupled to the container door to prevent the opening of the container door when in a locked position and to allow the opening of the container door when in an unlocked position. The safe also has a gun tray mounted within the container for movement between a retracted position confined within the container and an extended position at least partially extending outward from the container.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIGS. 2-4 are a sequence of perspective views showing the opening of the automobile headrest safe of FIG. 1, shown with a gun positioned therein.

DETAILED DESCRIPTION OF CERTAIN EMBODIMENTS

Figure 1:
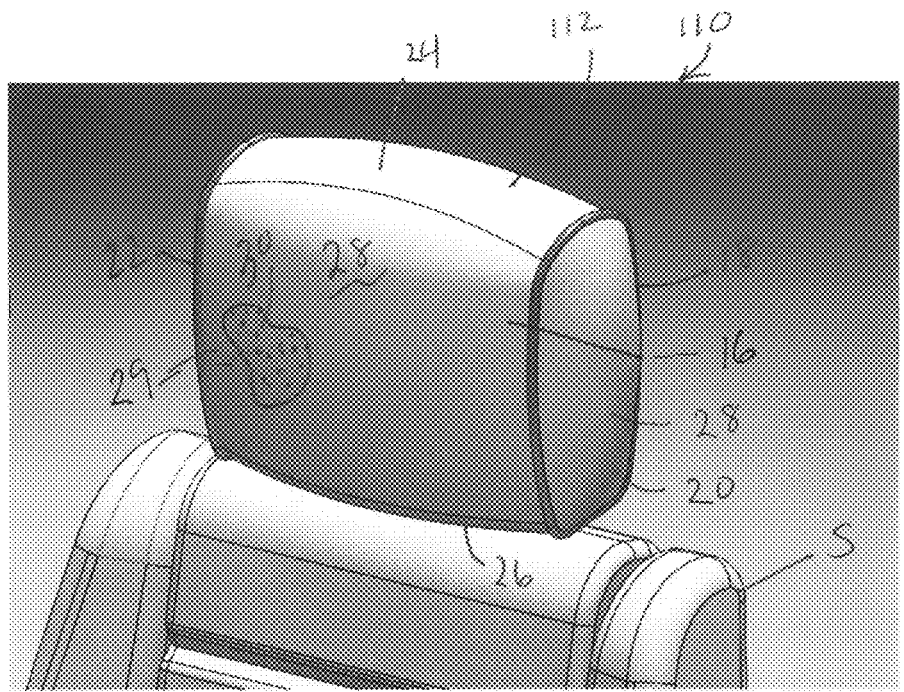
FIG. 1 is a perspective view of an automobile headrest safe embodying principles of the invention in a preferred form.

With reference next to the drawings, there is a shown an automobile headrest safe 10 in a preferred form of the present invention. The headrest safe 10 is used in conjunction with the seat S of the automobile, and preferably is aesthetically designed to be substituted for the standard seat headrest of the automobile to provide a uniform appearance to the automobile's interior. The headrest safe 10 is coupled to the standard seat through a link or member 11 which is configured similarly to the standard mounting member of the standard headrest.

The headrest safe 10 includes an exterior housing 12 which is made of a soft material and is shaped to conform to or resemble the standard, stock headrest of that particular automobile. The exterior housing 12 includes a front surface 16 which faces forward with respect to the automobile, a rear surface 18 facing rearwardly, a left side surface 20, a right side surface 22, a top surface 24 and a bottom surface 26. The left and right side surfaces 20 and 22 face laterally with respect to the automobile so that one side surface faces either the driver when mounted to the passenger seat or faces the passenger when mounted to the driver's seat. The exterior housing 12 has a pivotal exterior side door, door portion, or cover 28 and may include a soft cushion or filler material 30 underlying an outer covering 29.

Figure 2:
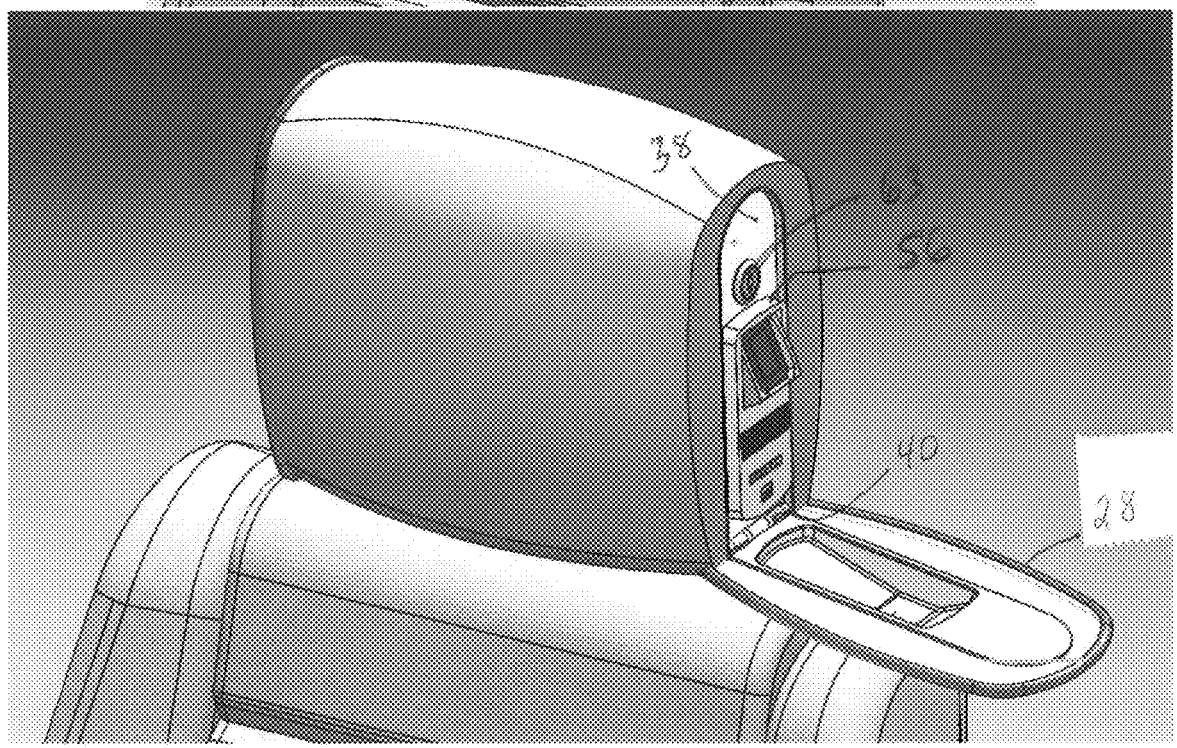

A hollow metal interior enclosure, housing, box, or container 34 is positioned within the interior of the exterior housing 12. The container 34 includes a tubular main or body portion 36 having an open end or opening 37 and a pivotal, reciprocating side door 38 having a spring 40 which biases the side door 38 from a closed position closing the body portion opening 37, shown in FIG. 2, to an open position allowing access to the interior of the container 34 through opening 37, shown in FIG. 3. The main portion 36 has a bottom wall 44, top wall 46, two side walls 48, and an end wall 50 oppositely disposed from the container side door 38.

The pivotal side door 38 includes a lock or locking device 56 which prevents the unauthorized opening of the side door 38. The lock 56 is preferably a biometric lock having a fingerprint reader 58. The lock 56 includes a latch 60 which engages a catch 62 mounted to the container 34. The lock 56 maintains the side door 38 in its closed or locked position. The lock 56 may also include an optional key cylinder lock 63 which may override the biometric lock for select access.

Figure 5:
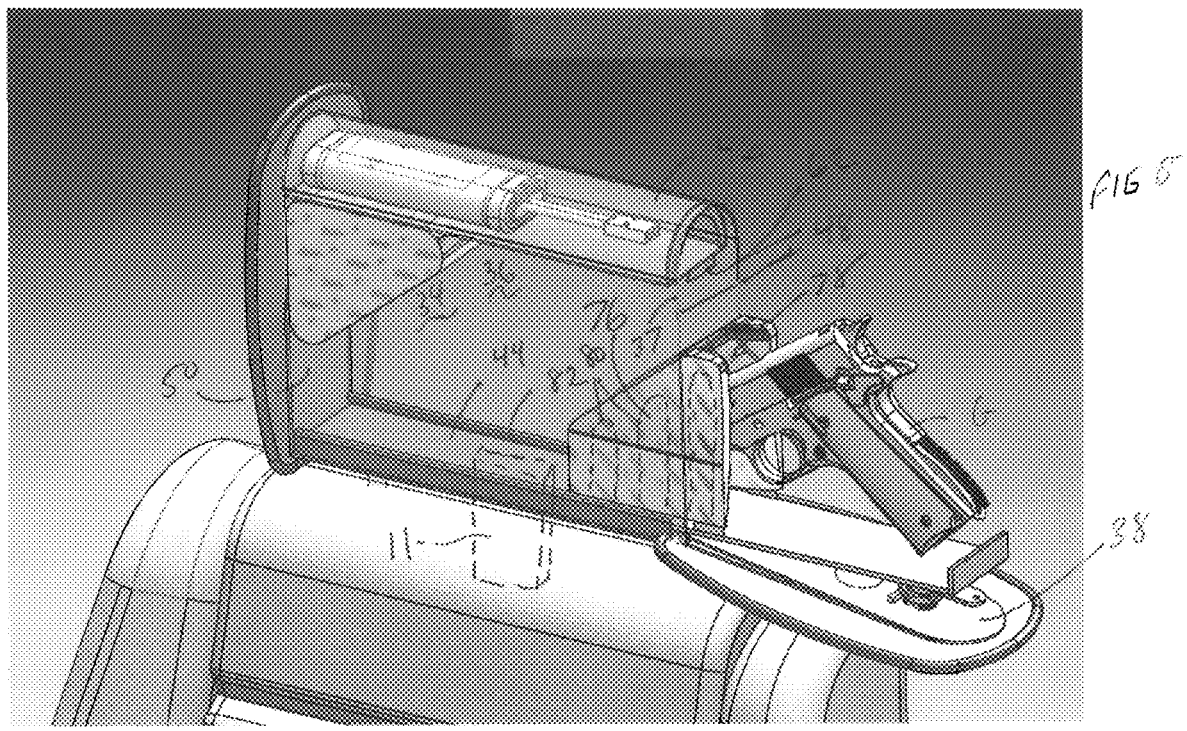
FIG. 5 is a perspective view of the automobile headrest safe of FIG. 1, shown with select portions removed or shown in phantom lines and shown with a gun positioned therein.
Figure 6:
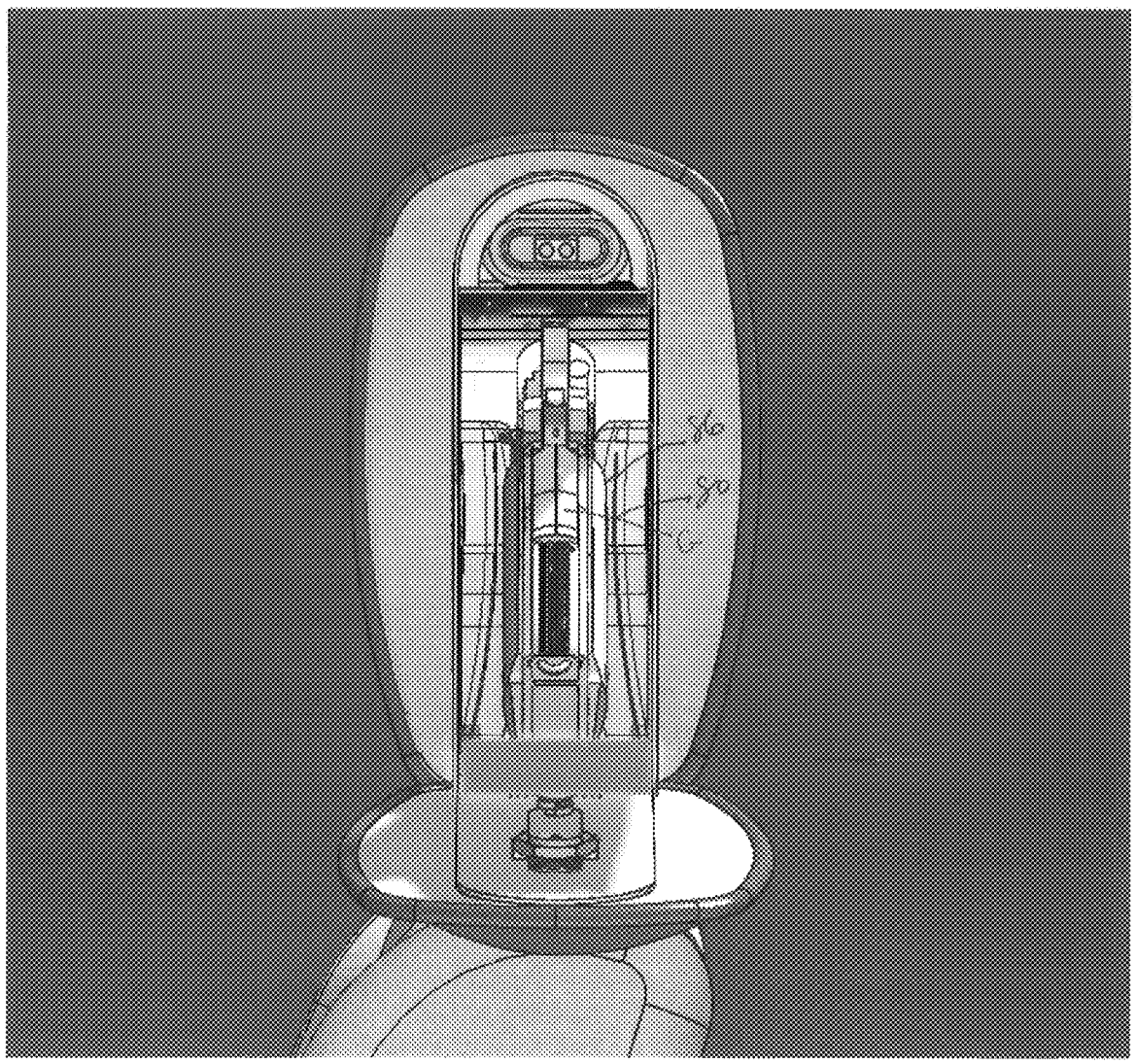
FIG. 6 is an end view of the automobile headrest safe of FIG. 1, shown with a gun positioned therein.

A reciprocating gun slide, holder, or tray 70 is mounted within the interior of the container 34 for reciprocal movement between a retracted or stowed position, shown in FIG. 3, and an extended position, shown in FIG. 4. The tray 70 includes a floor 72, an end lip or finger flange 74, and two sidewalls 76 forming a gun channel 78 therebetween. The tray 70 is sized and shaped to house a pistol or gun G upon the tray 70 and within the gun channel 78. The side edges 80 of the tray of configured to be received within grooves 82 extending into the container 34 to form a tongue and groove type arrangement to allow reciprocal sliding of the tray 70. A resilient cushion or compressible layer 86 may be mounted to the inboard or interior surface of the side walls 76 to provide a soft yet snug cradling or holding of the gun G within the gun channel 78, to prevent unwanted movement of the gun G when stowed, but maintain the upright positioning of the gun G for easy extraction from the tray 70. The side walls 76 may include or be in the form of a plurality of flexible fingers 80 mounted within the cushion 86, as shown in FIG. 5.

The exterior side door 28 is configured to overlay the container side door 38. The exterior side door 28 and underlying door 38 are preferably located on the left side surface 20 of a passenger seat so that the side door portion 66 is facing the driver of the automobile, assuming a left side driver's seat position. Of course, should the headrest safe be mounted to a driver's seat, the exterior side door 28 and underlying container side door 38 should be positioned on the right side surface 22 facing the passenger positioned on the passenger seat. The exterior side door 28 moves independently of the container side door 38 between a closed or locked position and an open position. The exterior side door 28 may be maintained in a closed position through any conventionally know latch or catch, such as hook and loop type fasteners, magnetic fasteners, mating snaps, press fitting of the exterior side door 28 into the surrounding headrest 12, straps, or the like.

The headrest safe 10 may be coupled to the automobile seat through any conventionally known mounting means, and preferably couples to the seat through the same means as the original manufactured car seat headrest. For example, the headrest 10 may be coupled to the seat through a single mounting post, double mounting posts, or the like. The mounting means should be robust enough to prevent the theft of the headrest safe by its forcible removal from the seat.

In use, the headrest safe 10 is coupled to the seat S of an automobile in the same position as the originally manufacturer's headrest. As the headrest safe is primarily configured to be accessible to the automobile driver, the headrest safe 10 is shown mounted to the passenger seat of the automobile of a left side driver position automobile. As such, the headrest exterior side door 28 and underlying container side door 38 are on the left side of the headrest facing the driver, although the opposite configuration may be made should the headrest safe 10 be mounted to the driver's seat for use and access by a passenger, again assuming a left drive automobile.

A person may place a pistol or gun G within the headrest safe 10 by opening the exterior side door 28 and container side door 38 through the unlocking activation of the lock 56, by placing a recognized, preprogrammed finger upon the fingerprint reader 58. The authorization or recognition of the fingerprint upon the fingerprint reader 58 activates the lock 56 so that the latch 60 releases the catch 62, which allows the biasing force of the spring 40 to move the side door 38 from its closed position to its open position. The sliding tray 70 may be moved to its extended position, shown in FIG. 4, so that the gun is placed upon the tray 70 and within the gun channel 78. The tray 70 is then slid back to its stowed position. The side door 38 may then be moved to the closed or locked position to secure the gun G within the headrest safe 10. The exterior side door 28 is then moved to its closed position.

The side walls 76 may be constructed to have internally mounted flexible, inwardly biasing members 77 which provide a spring biasing aspect to the side walls 76 in a direction towards each other to provide a releasable cradling or holding of the gun G mounted therebetween.

Should it be necessary to quickly access the gun G contained within the headrest safe 10, the driver need only reach over, open the exterior side door 28 and place a finger upon the fingerprint reader 58 of the container side door 38. The reading of the driver's fingerprint activates the lock 56, which releases the catch 62 from the lock latch 60 causing the automatic opening of the side door 38 through the biasing force of the spring 40. With the container side door 38 now open, the driver may reach into the container 34 through opening 37 and pull out the tray 70 by pulling upon the finger flange 74, thereby exposing the gun G. The upright positioning of the gun G through the fit of the side walls 76 and gun channel 78 provides immediate access to the gun G in a natural position wherein a person's finger may be placed immediately adjacent the gun's trigger.

It should also be noted that the positioning of the exterior side door 28 and container side door 38 on the side of the headrest allows for direct access by the person in the oppositely disposed seat. This is a distinct advantage over the prior art wherein the door was positioned on the rear of the headrest, facing the back of the automobile. Such a rearward facing door does not allow for quick access to the interior of the headrest container and the gun therein.

Lastly, it should also be noted that the spring loading of the side door 38 is an option, but provides for a quick and reliable opening of the side door with minimal effort. Again, this allows for the quick access of the interior of the headrest container and the gun therein.

Variations of the headrest safe fall within the spirit of the claims, below. It will be appreciated that the inventions are susceptible to modification, variation, and change without departing from the spirit thereof.

The invention claimed is:

1. A safe adapted to be mounted to an automobile seat, the safe comprising,
an exterior housing contoured to resemble a car headrest, the exterior housing having a front surface oriented relative to the front surface of the automobile seat, a rear surface oppositely disposed from said front surface, two oppositely disposed side surfaces extending between said front surface and said rear surface, a top surface extending between said front surface and said rear surface, and a bottom surface extending between said front surface and said rear surface, one said side surface having a pivotal door portion for reciprocal movement between a closed position and an open position;
an enclosed container mounted within said exterior housing, said container having a main portion and a container door pivotally mounted to said main portion for reciprocal movement between a locked position enclosing said container and an unlocked position;
a latch coupled to said container door to allow the opening of said container door;
a lock coupled to said container door to prevent the opening of said container door when in a locked position and to allow the opening of said container door when in an unlocked position, and
a gun tray mounted within said container for reciprocal movement between a retracted position confined within said container and an extended position at least partially extending outward from said container, said gun tray not being directly coupled to said container door.

2. The safe of claim 1 wherein said gun tray includes a floor and sidewalls extending from said floor spaced apart from each other to define a gun holding space between said sidewalls.

3. The safe of claim 2 wherein said sidewalls are spring biased towards each other.

4. The safe of claim 2 wherein each said sidewall includes a compressible layer facing said other sidewall.

5. The safe of claim 1 wherein said gun tray includes an upwardly extending finger flange.

6. The safe of claim 2 wherein said gun tray includes an upwardly extending finger flange.

7. The safe of claim 1 wherein said container includes two oppositely disposed grooves, and wherein said tray includes oppositely disposed side edges slidably receivable within said container grooves for sliding movement of said gun tray.

8. The safe of claim 1 wherein said lock is a biometric lock.

9. The safe of claim 1 further comprising a mounting member extending from said exterior housing for coupling said safe to the automobile seat.

10. A gun safe adapted to be mounted to an automobile seat, the gun safe comprising,
a housing having a forward facing front surface oriented relative to the front surface of the automobile seat, a rear surface oppositely disposed from said front surface, two oppositely disposed side surfaces extending between said front surface and said rear surface, a top surface extending between said front surface and said rear surface, and a bottom surface extending between said front surface and said rear surface, one said surface having a pivotally mounted first door;
a second pivotal door pivotally mounted to said exterior housing;
a gun tray coupled within said housing for movement between a retracted position confined within said housing and an extended position at least partially extending from said housing, said gun tray not being directly coupled to said first pivotal door or second pivotal door, and
a lock coupled to said housing door to prevent the opening of said housing door when in a locked position.

11. The gun safe of claim 10 wherein said housing includes an exterior housing and an enclosed interior housing mounted within said exterior housing.

12. The safe of claim 10 wherein said gun tray includes a floor and sidewalls extending from said floor spaced apart from each other to define a gun holding space between said sidewalls.

13. The safe of claim 12 wherein said sidewalls are spring biased towards each other.

14. The safe of claim 12 wherein each said sidewall includes a compressible layer facing said other sidewall.

15. The safe of claim 10 wherein said housing includes two oppositely disposed grooves, and wherein said tray includes oppositely disposed side edges slidably receivable within said housing grooves for sliding movement of said gun tray.

16. The safe of claim 10 further comprising a mounting member extending from said housing for coupling said safe to the automobile seat.

17. An automobile seat safe comprising,
a seat having a backrest portion and a seating portion forward of said backrest portion, the backrest portion including a headrest, said headrest including a headrest door;
an interior housing mounted within said headrest, said interior housing having a tubular body portion having an opening therein and an interior housing door pivotally mounted to said body portion to close said opening, said headrest door overlying said interior housing door,
a reciprocating gun holder mounted within said interior housing for reciprocal movement between a retracted position confined within said housing and an extended position at least partially extending from said housing, said reciprocating gun holder not being directly coupled to said headrest door or interior housing door, and
a lock coupled to said interior housing door to prevent the opening of said interior housing door when in a locked position and allowing the opening of said interior housing door when in an unlocked position.

18. The safe of claim 17 wherein said gun holder includes a floor and sidewalls extending from said floor spaced apart from each other to define a gun holding space between said sidewalls.

19. The safe of claim 18 wherein said sidewalls are spring biased towards each other.

* * * * *